United States Patent [19]

Baun

[11] Patent Number: 4,733,696

[45] Date of Patent: Mar. 29, 1988

[54] PILOT OPERATED COOLANT CONTROL VALVES

[76] Inventor: Daniel Baun, 696 McClurg, Boardman, Ohio 44512

[21] Appl. No.: 78,260

[22] Filed: Jul. 27, 1987

[51] Int. Cl.[4] .............. F16K 11/22

[52] U.S. Cl. .............. 137/883; 137/885; 251/30.01

[58] Field of Search .............. 137/885, 884, 861, 883; 251/30.1, 31, 367

[56] References Cited

U.S. PATENT DOCUMENTS

| | | | |
|---|---|---|---|
| Re. 31,529 | 3/1984 | Lowe | 137/885 X |
| 3,145,967 | 8/1964 | Gardner | 251/61.1 |
| 3,159,374 | 12/1964 | Kroffke | 251/61.1 |
| 3,556,144 | 1/1971 | Bickers et al. | 137/884 X |
| 3,880,358 | 4/1975 | Schaming | 239/551 |
| 4,247,047 | 1/1981 | Schaming | 239/391 |
| 4,360,037 | 11/1982 | Kendall | 137/242 |
| 4,378,027 | 3/1983 | Weirich et al. | 137/885 X |
| 4,387,739 | 6/1983 | Schaming | 137/884 |
| 4,391,296 | 7/1983 | Abbott | 137/523 |
| 4,568,026 | 2/1986 | Baun | 239/551 |
| 4,586,531 | 5/1986 | Lindell | 137/885 X |

*Primary Examiner*—A. Michael Chambers
*Assistant Examiner*—John C. Fox
*Attorney, Agent, or Firm*—Harpman & Harpman

[57] ABSTRACT

A plurality of pilot operated coolant control valves are mounted in a multiple configurationed manifold positioned to supply coolant to spray nozzles upon activation of adjacent pilot valves within the same manifold via remote power and signal sources.

5 Claims, 3 Drawing Figures

PILOT OPERATED COOLANT CONTROL VALVES

BACKGROUND OF THE INVENTION

1. Technical Field

This invention relates to coolant control valves for rolling mills that are used for the reduction of metals and require coolant to be supplied during use.

2. Description of the Prior Art

Prior art devices of this type have generally relied on a plurality of remotely positioned pilot control valves requiring a large number of inter-connecting controlled conduits extending from the pilot valves to the coolant control valves at the point of us. Prior art patents relating to pilot operated control valves include U.S. Pat. Nos. 3,145,967, 3,159,374, 4,391,296, 3,880,358, 4,360,037, 4,387,739, 4,247,047 and applicant's U.S. Pat. No. 4,568,026.

In U.S. Pat. No. 3,145,967 an elastic sleeve is arranged in relation to a core positioned in a fluid passageway and by the introduction of air pressure will distort the plastic sleeve inwardly against the core closing the fluid passageway. The air pressure is controlled by a solenoid operated valve.

In U.S. Pat. No. 3,159,374 a flexible diaphragm is arranged to intercept a fluid passageway through the valve when fluid pressure is applied to one side of the diaphragm to distort same, closing the passageway. The fluid pressure for operating the diaphragm is controlled by a solenoid valve.

In U.S. Pat. No. 4,391,296 a valve having a valve plug which moves in and out of closing relation respect to a fluid passageway between an inlet and an outlet port is shown wherein the valve plug is urged closed by a spring and moved to open position by a solenoid.

In U.S. Pat. No. 3,880,358 a coolant control valve is disclosed which utilizes a spring urged valve element for closed position and a control fluid, such as air, to urge the valve element to open position.

In U.S. Pat. No. 4,360,037 a self-cleaning filter assembly for a solenoid actuated valve is disclosed which uses fluid pressure to operate a diaphragm to control the opening and closing of the valve.

In U.S. Pat. No. 4,387,739 a valve module for a digital coolant control system is disclosed which utilizes a solenoid urged valve element with a spring return to control the fluid coolant through the passageway defined.

In U.S. Pat. No. 4,247,047 a zoned digital coolant system is disclosed which shows a plurality of valves in a multiple manifold configuration with each of the valve elements being activated by a solenoid and spring return for the supply of coolant to a spray nozzle.

Finally, in applicant's U.S. Pat. No. 4,568,026 a pilot operated coolant control valve in a manifold assembly is disclosed which defines the combination of a cartridge valve system having a spring urged valve element for control of coolant to a spray nozzle activated by an encased adjacent pilot control valve which is activated by a solenoid and spring return. The patent allows for multiple positioning of easily replaced cartridge valve assemblies within a multiple manifold configuration including the electrical connections in a totally enclosed environment.

Applicant's present invention allows for positioning point of use control of coolant valves reducing the cost and complexity of installation and repair time normally required due to the length of the pilot air supply lines from the pilot valves which are normally remotely located to the coolant control valves as normally found in standard rolling mill environments.

SUMMARY OF THE INVENTION

A pilot operated multiple coolant control valve assembly for use in rolling mills provides for a series of coolant control valves and associated pilot controls to be positioned in a single assembly at the point of use. Each of the coolant control valves is controlled independently via a solenoid operated pilot control valve encapsulated adjacent each of the coolant control valves. The valve assemblies provide safe reliable operation in a difficult and dirty environment by isolating the pilot controls and control valves in a multiple segmented housing manifold.

DESCRIPTION OF THE PREFERRED EMBODIMENT

Figure 1:
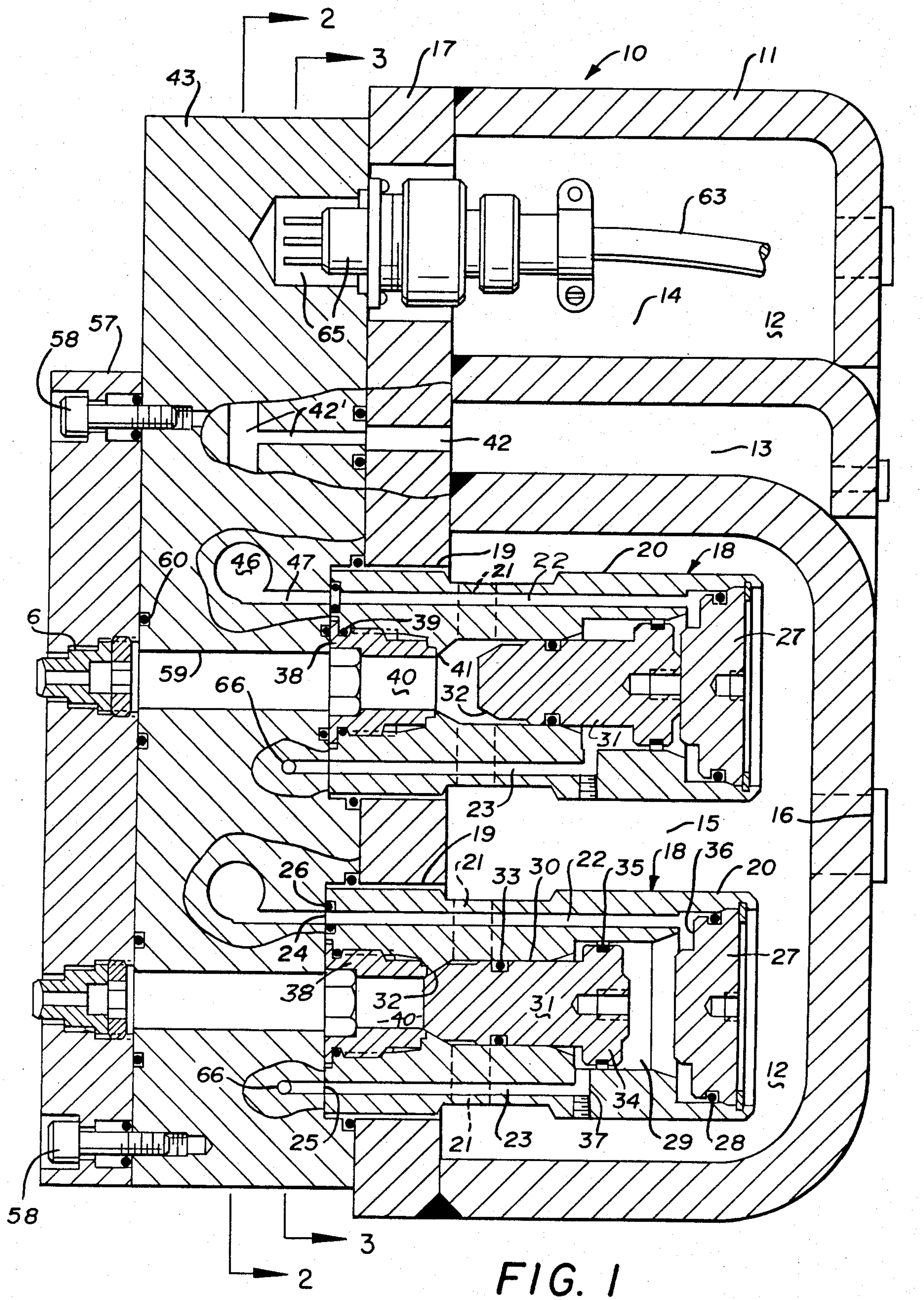
FIG. 1 is cross-sectional elevation of a manifold assembly and associated coolant control valves.

Referring to FIG. 1 of the drawings a pilot operated coolant control valve assembly 10 can be seen comprising a multiple housing configuration 11 with oppositely disposed closed ends 12 defining a pilot air supply chamber 13, a electrical control chamber 14 and a coolant supply chamber 15. Coolant inlet ports 16 are positioned in the housing configuration 11 adjacent to and communicating with the coolant supply chamber 15. A plurality of body members 17 are sealingly attached to an open side of the housing 11 and carry a plurality of coolant control valves 18 in spaced apertures 19 therein. Each of the coolant control valves 18 is comprised of a cylindrical valve body 20 having several openings 21 within. The openings 21 in each cylindrical valve body 20 define coolant passageways to the valves 18. A pilot air passage 22 and a vent air passage 23 extend from the interior of the cylindrical valve body 20 to openings 24 and 25 respectively having annular sealing o-rings 26 around the opening 24. A closure 27 is secured in sealing relation by an o-ring 28 in an open end of the cylindrical valve body 20 opposite said openings 24 and 25 and defines a pilot air activation chamber 29. An area of reduced interior diameter at 30 in the pilot air activation chamber 29 has a movable valve element 31 positioned partially therein. The valve element 31 has a conical end 32 with a annular groove and a annular sealing member 33 in the area of reduced diameter 30 with a larger opposite end portion 34 within the pilot air activation chamber 29. A secondary annular sealing member 35 is positioned in the larger opposite end portion 34 dividing the pilot air activation chamber 29 between a pilot air inlet 36 and a vent outlet at 37. An annular reduction fitting 38 is threadably secured in the opposite open end of the cylindrical valve body 20 and has a sealing member 39 adjacent one end. The reduction fitting 38 defines a coolant passageway 40 and a portion of a valve seat 41 most of which is in the adjacent valve body 20.

Figure 2:
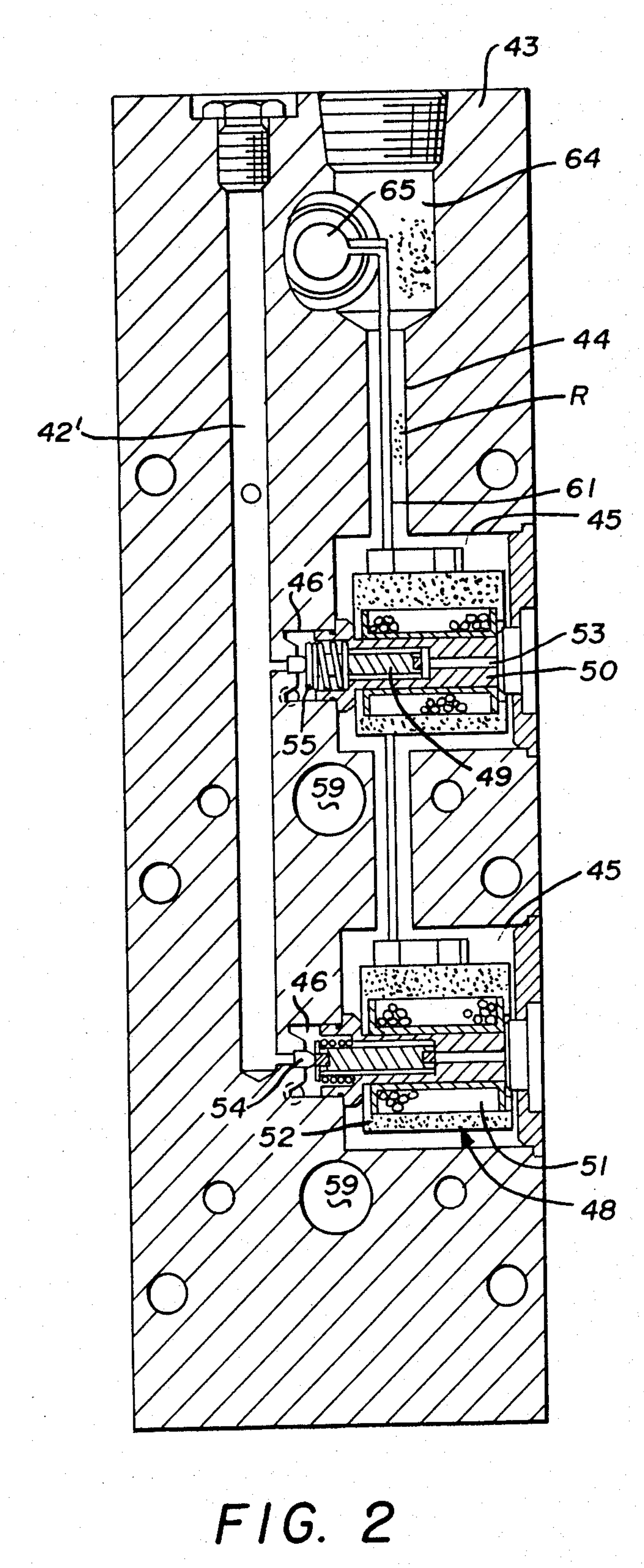
FIG. 2 is a cross-sectional view on lines 2—2 of FIG. 1.

Referring now to the pilot air supply chamber 13 an outlet 42 is formed in the body member 17 and communicates with a pilot air conduit 42' in a pilot valve mounting body 43 which is in sealing relation with the body member 17 as best seen in FIG. 2 of the drawings. The pilot valve mounting body 43 also has a wire way 44 extending in parallel spaced relation to said pilot air conduit 42'. A pair of spaced longitudinally aligned cavities 45 extend into the pilot valve mounting body member 43 intersecting said wire way 44 and each of the pilot valve chambers 46 thereof. A passageway 47 establishes communication between the pilot valve chamber 46 and the pilot air passage 22 in the cylindrical valve body 20 as hereinbefore described. Pilot valves 48 are positioned within the pilot valve chambers 46 and each comprises a solenoid plunger 49 which is movably positioned in a sleeve 50 which defines part of the pilot valve chamber 46 and which sleeve 50 is positioned within a solenoid coil 51 which is encapsulated by a suitable resin 52 which holds the solenoid coil 51 in the cavity 45 intersecting the pilot air conduit 42'. The sleeve 50 has a passageway 53 positioned on the end thereof opposite the pilot valve chamber 46 and communicates with the atmosphere.

Still referring to FIG. 2 of the drawings, it will be seen that the plunger 49 moves to the right responsive to energization of the coil 51. A seal in the opposite end of the plunger 49 engages and closes an opening in the pilot valve seat 54 when the coil 51 is de-energized and a spring 55 moves the plunger 49 to the left as is illustrated in FIG. 2 on the lower of the two pilot valves illustrated.

In operation, when this occurs, the fluid air pressure extends through the pilot valve chamber 46, the passageway 47 and the air passageway 22 through the inlet 36 into the pilot air activation chamber 29 forcing the valve element 31 forward overcoming the coolant pressure through the openings 21 in the cylindrical valve body 20 shutting off the flow of coolant to a nozzle 56 in a nozzle plate assembly 57 via a coolant passageway 59 within the body member 43. The nozzle plate assembly is secured to the pilot valve mounting body member 43 by fasteners 58.

An O-ring 60 is positioned around each of the spray nozzles 57 sealing the nozzle plate assembly 58 thereto. Upon de-energization of the solenoid coil 51 the plunger 49 urged by the spring 55 seals against the pilot valve seat 54 as hereinbefore described shutting off the pilot fluid pressure against the valve element 31. The differential of coolant pressure forces the valve element 31 back within the pilot air activation chamber 29 allowing the coolant to flow out through the spray nozzles 56. The solenoid coil 51 is activated by an electrical control circuit via control wires 61 extending from a multiple electrical plug 62 seen in both FIGS. 1 and 2 of the drawings extending by cable 63 through the electrical control chamber 14. The control wire passageway 44 has an area of increased interior diameter at 64 that intersects with a right angularly positioned secondary control passageway 65 in the pilot valve mounting plate 43 into which extends the hereinbefore described multiple electrical plug 62. Each of the pilot control valves 48 and associated wire ways 44 are filled with epoxy resin R encapsulating the components and wires within the pilot valve mounting plate 43.

Figure 3:
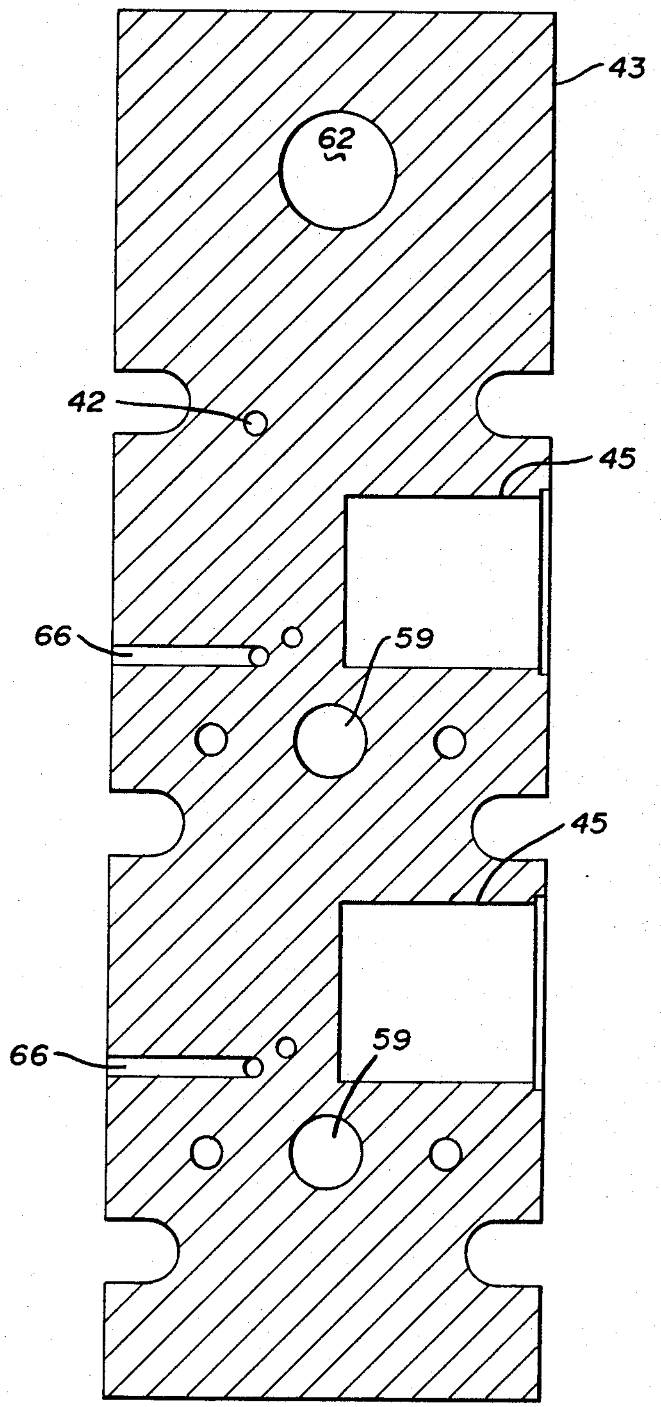
FIG. 3 is a cross-sectional view on lines 3—3 of FIG. 1.

Referring now to FIG. 3 of the drawings, the cavities 45 have adjacent vent extending passageways 66 that align with said vent passageways 23.

The solenoid coils 51 being sealed and held in place by the epoxy resin are protected from damage which might occur from the contaminated environment in which the valve assembly is placed. The solenoid coils 51 are designed to operated at 24 volts DC and draw a maximum of 0.30 amps. The plungers 49 and coils 51 are so designed that the same are fully operational at 85% of indicated voltage and thus evidence small power requirements which substantially improve the device, both with respect to automatic and manual input signals for operation.

Thus, it will be seen that coolant control valves in a manifold assembly have been illustrated and described and that it will be apparent to those skilled in the art that various changes and modifications may be made therein without departing from the spirit of the invention, therefore I claim:

1. An improvement in pilot operated coolant control valves in a manifold assembly for supplying a coolant under pressure, the improvement comprises in combination forming the coolant control valves as removable assemblies positioned within an apertured body member closing said manifold, independent pilot control valves positioned in a pilot valve mounting plate removably secured against said apertured body member, each of said coolant control valve assemblies consisting of a cylindrical valve body apertured inwardly of one end, a pilot valve chamber within said cylindrical valve body, a valve element movably positioned within said pilot valve chamber, a valve seat in said valve body, means for closing one end of said apertured valve body, sealing means on said valve element, a pilot air passageway and a vent air passageway within said cylindrical valve body member communicating with said pilot control valves and the atmosphere respectively, a coolant chamber in said manifold, apertures in said cylindrical valve body communicating with said coolant chamber, a solenoid coil in said pilot control valve for moving a solenoid plunger therein when energized, secondary valve elements on the ends of said solenoid plunger, a pilot air supply chamber within said manifold, means communicating between said pilot control valve and said pilot air supply chamber, oppositely disposed passageways communicating with said pilot air chamber to maintain said valve element closed against said valve seat stopping the flow of coolant when said solenoid coil is de-energized, a spring for moving said plunger to seal said pilot air passageway whereby coolant pressure moves said valve element supplying said coolant to a spray means in communication with said coolant supply valve, an electrical circuit in communication with said solenoid coil for energizing the same.

2. The improvement in pilot operated coolant control valves set forth in claim 1 wherein said pilot air passageway in said cylindrical body member communicates with said pilot valve through said pilot valve mounting plate.

3. The improvement in pilot operated coolant control valves set forth in claim 1 wherein said means for closing one end of said apertured valve body comprises an annular closure sealingly engaged therein.

4. The improvement in pilot operated coolant control valves set forth in claim 1 wherein said sealing means on said valve element comprises o-rings therein.

5. The improvement in pilot operated coolant control valves of claim 1 wherein said electrical conductors in communication with said solenoid coils extend through passageways in said pilot valve body member, electrical receptacles within said body member for engagement with said electrical conductors and wherein said passageways and said cavity within said pilot valve body member is filled with epoxy resin.

* * * * *

UNITED STATES PATENT AND TRADEMARK OFFICE
CERTIFICATE OF CORRECTION

PATENT NO. : 4,733,696

DATED : March 29, 1988

INVENTOR(S) : Daniel Baun

It is certified that error appears in the above-identified patent and that said Letters Patent is hereby corrected as shown below:

column 3, line 30 after the word when, erase "this occurs" and insert ---the coil 51 is energized--- in place thereof.

Column 4, claim 1, line 43, erase "de-energized" and insert ---energized--- in place thereof.

Signed and Sealed this

Twenty-second Day of June, 1993

Attest:

MICHAEL K. KIRK

Attesting Officer

*Acting Commissioner of Patents and Trademarks*